UNITED STATES PATENT OFFICE.

ANDERS GADD AND GUSTAF DILLBERG, OF ÖVEDSGÅRD, NEAR ÖVEDSKLOSTERSGÅRD, SWEDEN.

MEANS AND METHOD FOR PROTECTING FROM DECOMPOSITION AND PUTREFACTION VEGETABLE FIBERS, &c.

936,113.

Specification of Letters Patent.

Patented Oct. 5, 1909.

No Drawing.

Application filed December 13, 1907. Serial No. 406,384.

*To all whom it may concern:*

Be it known that we, ANDERS GADD and GUSTAF DILLBERG, subjects of the Kingdom of Sweden, residents of Övedsgård, near Övedsklostersgård, Sweden, have invented a new and useful Means and Method for Protecting from Decomposition and Putrefaction Vegetable Fibers and Articles and Materials Made of Same, of which the following is a specification.

This invention relates to a process of treating vegetable fibers and articles and materials made thereof for the purpose of protecting the same from decomposition and putrefaction. And the object is to afford such means (substances, solutions and combinations of same) that the goods treated therewith will practically resist the action of water, air, microbes and other influences.

Materials made of vegetable fibers are very numerous and are manufactured and used for innumerable purposes. Therefore, in order to herein describe the nature of this invention and the manner in which it may be performed we select the treatment of fishing twine as an illustration of same.

Wherever fishing is carried on it has long been known that untreated twine and other fibrous fishing implements very quickly perish when used in the fishing waters, causing the owners serious losses in consequence. For many years numerous attempts have been made to so treat the fibers of the twine that they may for at least some time resist the injurious influences to which they are exposed in the fishing waters.

The main cause of the decomposition of vegetable fibers is that of fermentation. The preventive treatment of fishing twine in order to resist the action of the ferment on the fibers generally consists of tanning, oiling or tarring. To make these treatments at all effective it is necessary to very frequently repeat same, which causes not only loss of time, but also heavy expenditure. Nevertheless the twine is doomed to perish in a relatively short time. The tanning process is considered as being the most effective yet employed to protect the fibers of the twine. The more tannic acid the fibers are able to absorb the better the result. But as water quickly dissolves and extracts the tannic acid in the twine the treatment must be constantly renewed with short intervals.

The object of this invention is partly to make the tannic acid impervious to the action of water, partly to increase its properties of being able to resist fermentation.

Fermentation—arising from the decomposing activity of microbes, everywhere present in organic matter, air, water etc.—must be guarded against by means of treating the fibers with a substance which these microbes cannot attack with impunity. This is accomplished in the following manner: To a strong tanning solution, produced by boiling or otherwise dissolving in water a vegetable substance rich in tannic acid, such as catechu, quercitron, barks of various trees etc., is added a quantity of creolin or kindred products, the proportion of same depending on the strength of the tanning solution and the purity and strength of the creolin. If for instance the best quality of catechu is used for the tanning solution some 30–60 grams of same should be dissolved in one liter of water, to which is added 30–60 grams pure creolin of original manufacture and strength. The addition of creolin makes the tanning solution sterile and highly antiseptic which properties are transferred to the fibers of the twine when saturated with same.

This invention also requires the use of formalin to make the treatment complete. The formalin could be added to the tanning solution directly, but for avoiding coagulation or formation of a sediment in the tanning solution the formalin mixed with water should preferably be used separately, the articles to be treated being first saturated with the tanning solution and then with the formalin solution. In this way the sediment is formed and retained in the fibers. The formalin solution may contain 10–25 c. c. formalin of 40% strength and original manufacture. If other qualities are used the quantity of formalin required must be proportionate to its strength and purity. When the solutions are manufactured they may be made in concentrated form to save space, and should then be diluted with water before using.

When the twine etc. is to be treated the fibers of same should first be saturated with the tanning solution, preferably by immersion in the liquid. This accomplished, the twine should be deprived of its surplus liquid by wringing it out. The twine is then placed in the formalin bath or otherwise saturated with the formalin solution, and subsequently dried. The tannic acid etc. absorbed in the fibers will by the action of the formalin be caused to coagulate so as to be insoluble in water, cold as well as boiling, and consequently the tanning substance will be permanently fixed in the fibers of the twine. The fibers thus by this treatment having been permeated and covered with a sterilized and sterilizing, insoluble and intimately adhering substance will effectively and permanently resist the action of water, air, microbes and other influences injurious to them.

The treatment of fishing twine also applies to that of all other materials composed of vegetable fibers, such as all kinds of canvas for instance sails, tents etc.; ropes, cords, strings, threads etc.; wood work etc.

What we claim as our invention and desire to secure by Letters Patent, is:

1. Process of making fibrous material proof against decomposition which consists in treating threads and fabrics with a solution of tannic acid to which tar derivates rich in higher phenols have been added and then treating the goods with a solution of formaldehyde, substantially as described.

2. Process of making fibrous material proof against decomposition which consists in treating threads and fabrics with a solution of tannic acid and creolin and then treating the goods with a solution of formaldehyde, substantially as described.

In testimony whereof we have signed our names in the presence of two subscribing witnesses.

ANDERS GADD.
GUSTAF DILLBERG.

Witnesses:
E. HEDENSKOG,
A. LARSON.